Figure 1:
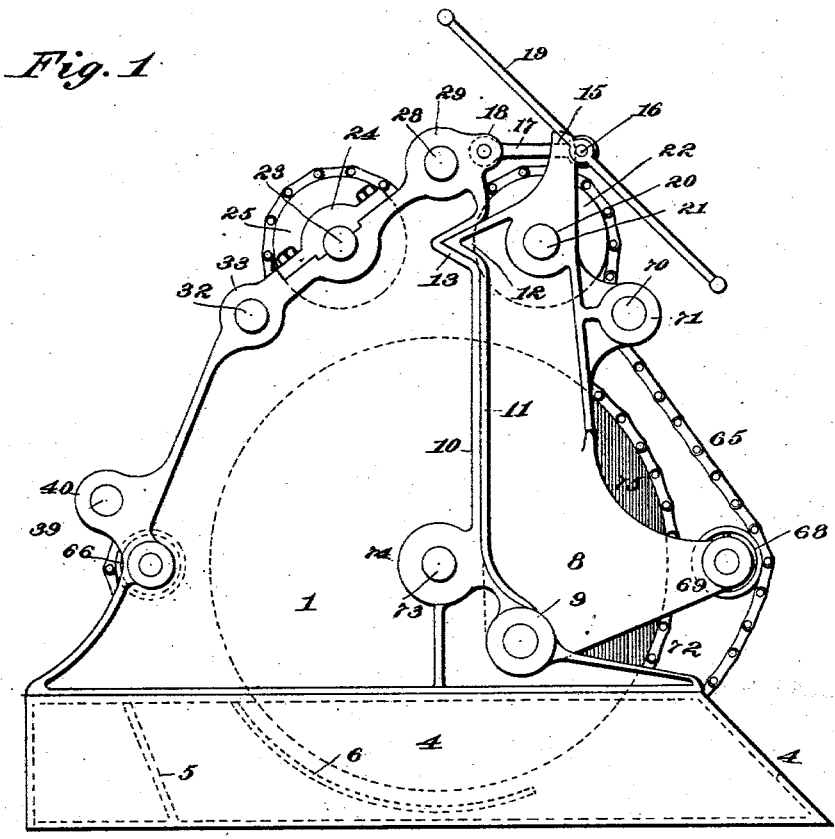

No. 629,345. Patented July 25, 1899.
F. L. DYER.
COTTON PRESS.
(Application filed Feb. 8, 1896.)

(No Model.) 4 Sheets—Sheet 1.

Witnesses. Inventor

No. 629,345. Patented July 25, 1899.
F. L. DYER.
COTTON PRESS.
(Application filed Feb. 8, 1896.)

(No Model.) 4 Sheets—Sheet 2.

Witnesses. Inventor
Frank L. Dyer

No. 629,345. Patented July 25, 1899.
F. L. DYER.
COTTON PRESS.
(Application filed Feb. 8, 1896.)

(No Model.) 4 Sheets—Sheet 3.

Witnesses. Inventor
Frank L. Dyer

No. 629,345. Patented July 25, 1899.
F. L. DYER.
COTTON PRESS.
(Application filed Feb. 8, 1896.)
(No Model.) 4 Sheets—Sheet 4.
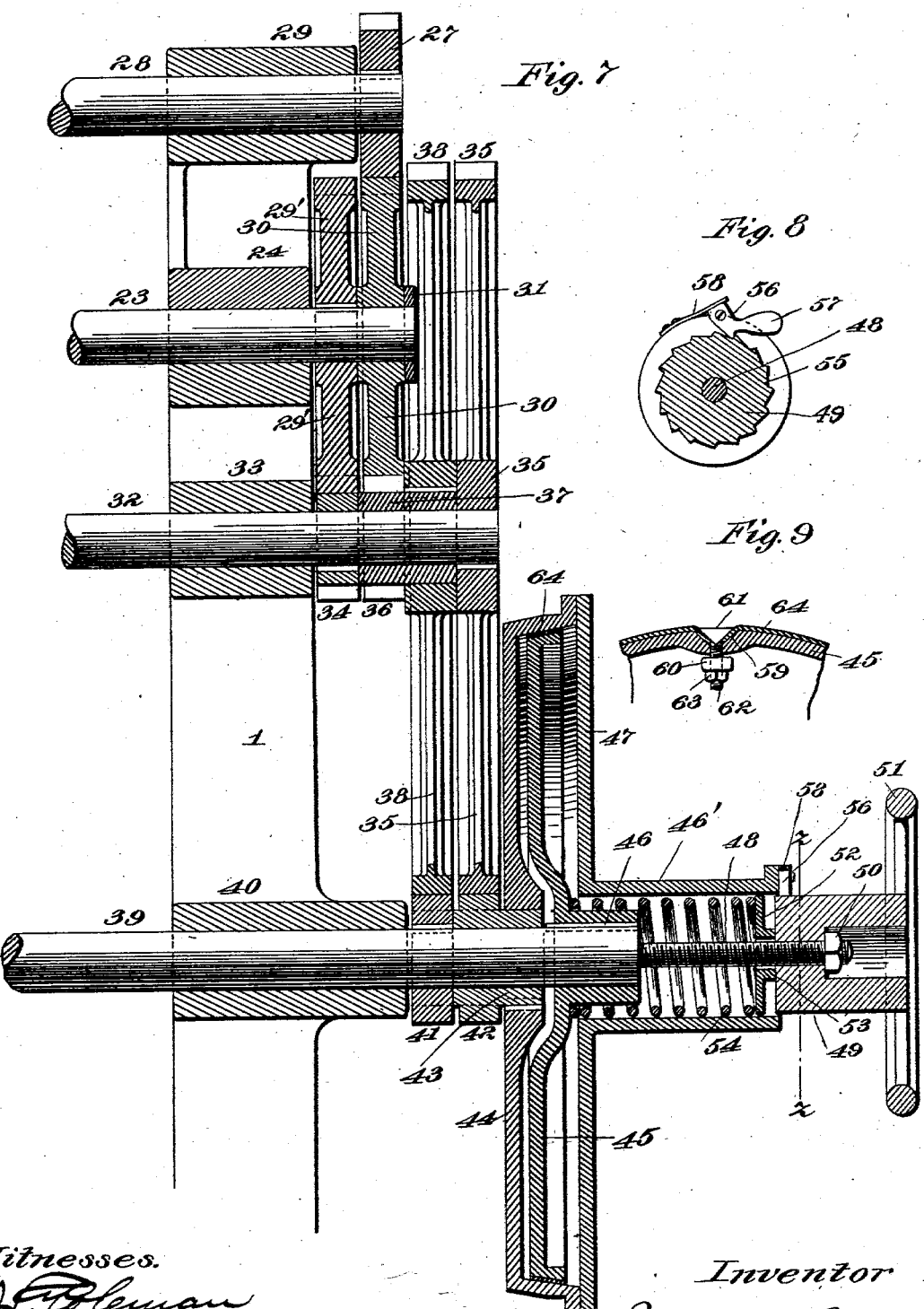
Witnesses.
Inventor
Frank L. Dyer

UNITED STATES PATENT OFFICE.

FRANK L. DYER, OF WASHINGTON, DISTRICT OF COLUMBIA, ASSIGNOR TO THE AMERICAN COTTON COMPANY, OF NEW YORK, N. Y.

COTTON-PRESS.

SPECIFICATION forming part of Letters Patent No. 629,345, dated July 25, 1899.

Application filed February 8, 1896. Serial No. 578,588. (No model.)

*To all whom it may concern:*

Be it known that I, FRANK L. DYER, a citizen of the United States, residing at Washington, in the District of Columbia, have invented certain new and useful Improvements in Cotton-Presses; and I do hereby declare the following to be a full, clear, and exact description of the invention, which will enable others skilled in the art to which it appertains to make and use the same.

The cotton-presses to which my invention relate are those which are designed for making cylindrical bales, and the specific type of those presses to which the invention has especial reference is that invented by John W. Graves, described and claimed in Letters Patent of the United States, dated December 3, 1893, numbered, respectively, 510,385, 510,386, 510,387, and 510,388.

The distinguishing feature of the Graves press is an endless belt, a portion of which is formed into a loop or bight wherein the bale is gradually accumulated by the partial winding of a continuous sheet or bat of cotton upon a core stationed in said loop or bight, the bale being at the same time subjected to pressure imposed by the belt. In order to impose the requisite tension on the belt and effect the pressing of the bale, a tension-roller is employed, mounted in said belt, and to which a weight or similar device is connected. It has been found from actual experience that a belt made of steel links is preferable to any other form of belt.

A cotton-press of the Graves type is of especial advantage in practical use for the reason that most of the surface of the bale is at all times subjected to pressure, whereas in the different forms of roller-presses which succeeded the invention of Graves the bale is subjected to pressure at only a small portion of its surface, and therefore the bale tends to expand at its portions which are not subjected to pressure, so that not only is the diameter of the bale limited, but toward the end of its operation it is liable to be more or less fluffy.

The principal objection to the use of a belt as described by Graves when a link belt is employed is that the constant movement of the links of the belt in passing over the various supporting-rollers and around the bale while the belt is subjected to great tension tends to quickly wear out the belt, so as to destroy its usefulness.

In Letters Patent No. 591,334, dated October 5, 1897, for cotton-presses, I described certain improvements made by me on the Graves press, by reason of which not only will the life of the belt be much prolonged, but also the press can be made much lighter and can be operated with less power. The broad principle underlying that invention made by me, as described in said patent, was the application of tension to only a portion of the belt, preferably that portion thereof which surrounds the bale, the remaining portion of the belt not being subjected to any tension other than its weight. In order that the principle thus broadly stated might be more easily comprehended, I illustrate in said patent a very conventional form of press, giving no regard to commercial requirements and making no effort to describe the best practical embodiment of the invention.

My present invention relates to improvements in cotton-presses, wherein I seek to carry forward in a more commercial and practical form the suggestions which were, so far as I am aware, given for the first time in said patent.

The cotton-press which forms the subject of the present application is designed for commercial use and possesses many advantages over any press for the manufacture of cylindrical bales with which I am familiar. Compared with any of such presses it is very much lighter and cheaper and can be operated with the expenditure of very much less power. Compared with the various roller-presses heretofore invented employing two rolls or a plurality of rolls it has the advantage of the Graves press inasmuch as the pressure is more evenly distributed over the bale and is applied to almost the entire surface thereof. Compared with the Graves press it has the advantages pointed out in my said application in that the belt is subjected to very much less wear and its life is therefore correspondingly prolonged.

In order that my present invention may be better understood, attention is directed to the accompanying drawings, forming part of this specification, and in which—

Figure 2:
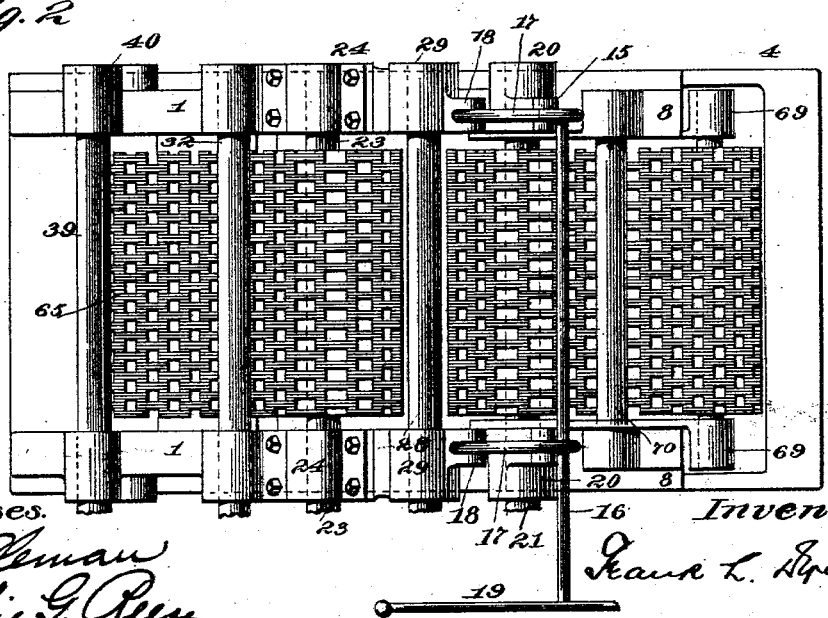
Figure 3:
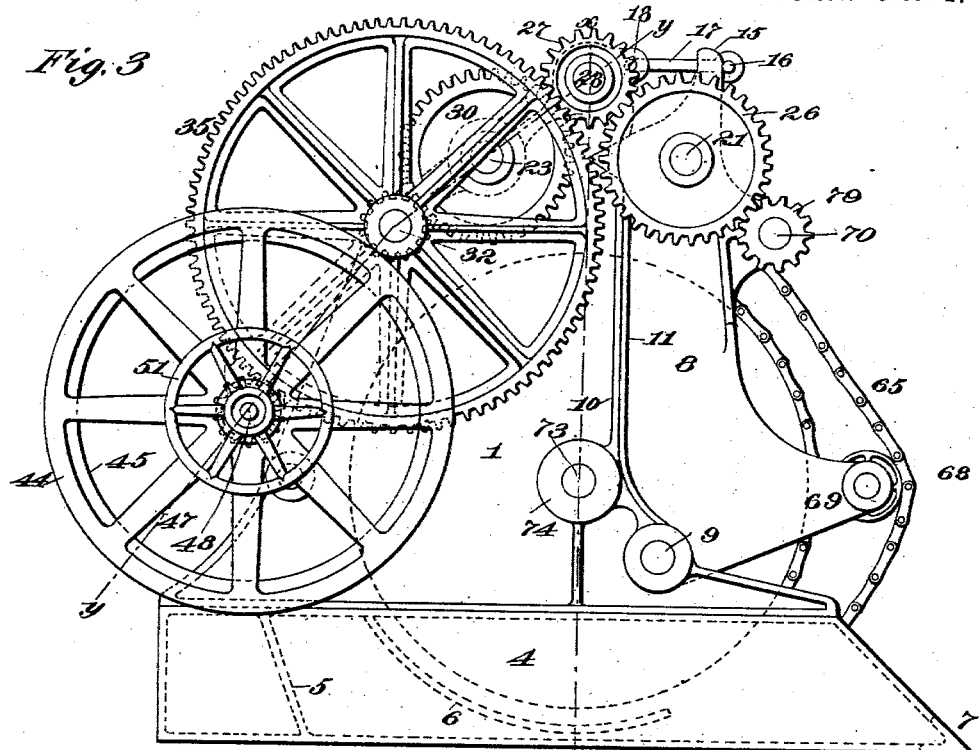
Figure 4:
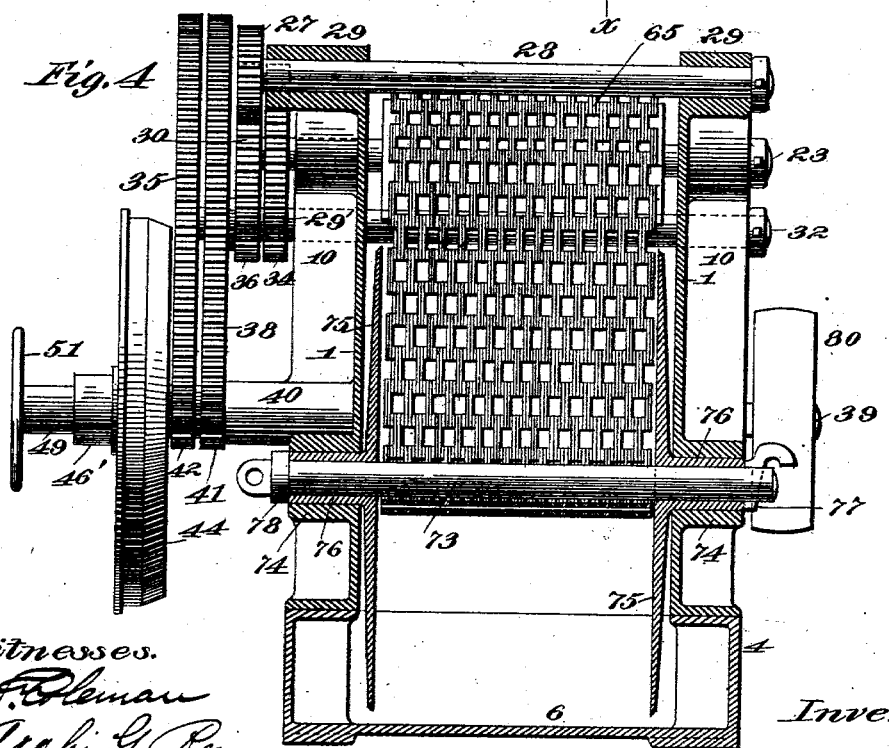
Figure 5:
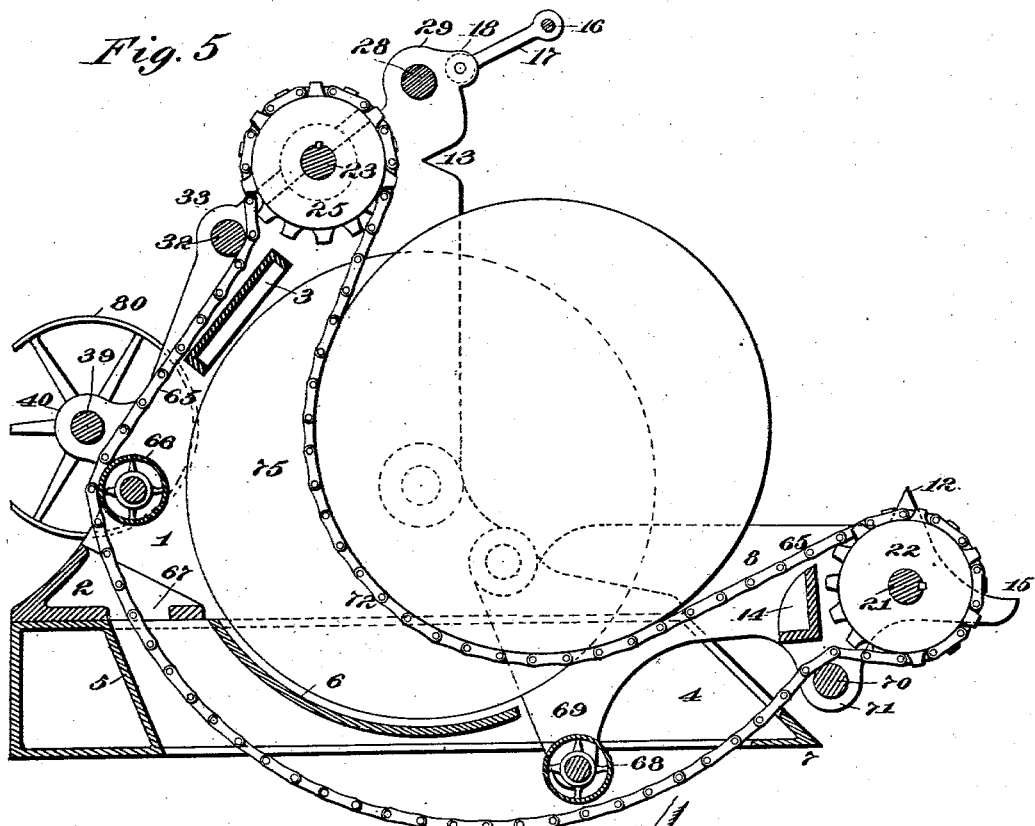
Figure 6:
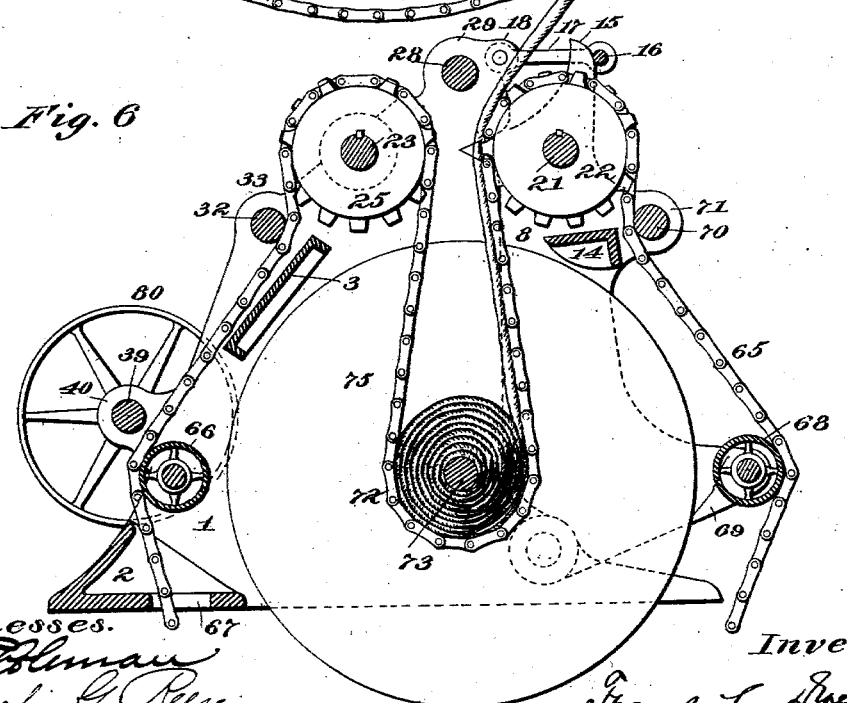

Figure 1 is a side view of the press, illustrating the general form of the frame, showing the driving-gears removed and illustrating the position of the parts at the completion of the bale; Fig. 2, a plan view thereof; Fig. 3, a side elevation of the press; Fig. 4, a section on the line $xx$ of Fig. 3; Fig. 5, a longitudinal sectional view showing the swinging arms in their downward position and illustrating the completed bale part way out of the press; Fig. 6, a longitudinal sectional view illustrating the position of the parts when the bale is partially formed, the bed being removed; Fig. 7, an enlarged sectional view on the line $y\,y$ of Fig. 3; Fig. 8, a section on the line $z\,z$ of Fig. 7, and Fig. 9 a detail view illustrating a convenient manner of applying a leather or other suitable friction surface to the brake when a brake is used.

In all of the above views corresponding parts are represented by the same reference-numerals.

1 1 represent the side frames of the machine, which may be of the form shown and which are held rigidly together by suitable web-plates 2 and 3, arranged at convenient points. Preferably these side frames are bolted to a heavy bed-plate 4, which may be cast in one piece, said bed-plate being stiffened by cross-braces 5, 6, and 7 cast therewith. If desired, said bed-plate may be dispensed with and the side frames 1 1 be carried upon suitable skids or in any other way. (See Fig. 6.)

8 8 are two swinging arms hinged to the side frame 1 by suitable joints 9. These joints 9 need not be as heavy as in the cross-braces, because there is little or no strain on them.

In order to suitably stiffen the side frames 1, a web 10 may be cast all around its edge, and for a similar purpose a web 11 may be cast around the upper portion of each arm 8, as shown. The webs 11 do not extend entirely around the arms, but are cut away at the lower portions thereof in order to allow said arms to swing down between the side frames 1 to the position shown in Fig. 5.

Preferably each arm 8 is provided with an integral nose or peak 12 at its upper portion, which fits within a recess 13, formed in each side frame 1, so that when the swinging arms 8 are moved to their normal positions and locked any strains thereon tending to elevate or depress them will be taken up by these interlocking portions 12 and 13.

In order to hold the two arms 8 8 together and cause them to move simultaneously, I connect them by a suitable cross-piece 14, as shown particularly in Figs. 5 and 6. Each arm 8 is provided at its upper portion with a pair of lugs or ears 15, with which a bar 16 engages, said bar being supported by heavy links 17, pivoted to eyes 18 of the side frames 1. When the bar 16 is brought down in front of the ears 15, the links 17 fit between each pair of ears, as shown in Fig. 2.

19 is a lever on the end of the bar 16, which may be turned so as to roll the bar 16 up on the ear 15 and disengage the swinging arms 8 when the bale is to be removed. The general arrangement of these swinging arms 8 and the locking device therefor are not my invention, and I do not claim the same broadly.

Mounted in suitable heavy bearing-boxes 20 in the arms 8 is a shaft 21, to which is keyed a sprocket-roller 22, having teeth arranged to engage with the links of the belt and which is made in any suitable way.

23 is a shaft carried in removable boxes 24 on the frames 1 in line with the shaft 21 and having a similar sprocket-roller 25 keyed thereto.

26 is a gear-wheel keyed to the shaft 21, preferably on the outside of one of the arms 8, and meshing therewith is a preferably smaller gear-wheel or pinion 27 on the shaft 28, mounted in boxes 29 at the extreme upper end of the side frames 1. The pinion 27 may be either turned loosely on the shaft 28 or on a suitable supporting-pin therefor; but preferably said pinion is keyed to said shaft so that said shaft will rotate. It is obvious that a gear-wheel may be secured to the other end of the sprocket-roller 22 and be driven from a corresponding pinion keyed to the other end of the shaft 28.

29' is a gear-wheel the same size of the gear-wheel 26, keyed to the shaft 23, which carries the sprocket-roller 25.

In Fig. 7 in order that the operation of the parts may be better followed out I have shown the gear-wheel 29' keyed to the shaft 23 on the outside of the frame; but it will be desirable in practice to key the gear-wheel 29' on the inside of the frame in order that the gear-wheels employed may be brought as near as possible up to the frame.

30 is a gear-wheel which in this instance is loosely mounted on the shaft 23 outside of the gear-wheel 29', being held in place by a thin collar 31 and meshing with the pinion 27.

32 is a shaft extending across the framework and mounted in bearings 33. Keyed to this shaft is a pinion 34, which meshes with the gear-wheel 29'.

35 is a large gear-wheel made, preferably, as large as practicable, keyed to the shaft 32, preferably at its outer end.

36 is a pinion the same size as the pinion 34, cast with the sleeve 37, mounted loosely on the shaft 32 between the gear-wheel 35 and the pinion 34.

38 is a gear-wheel keyed to said sleeve 37. The pinion 36 meshes with the gear-wheel 30.

39 is a shaft extending across the framework mounted in suitable bearings 40. Keyed to this shaft 39 is a pinion 41, which meshes with the gear-wheel 38. 42 is another pinion, in this instance the same size as the pinion 41, cast integral with the sleeve 43 and turning loosely on the shaft 49. Keyed to said sleeve 43 is one of the elements 44 of a brake device. The other element 45 of said brake device is keyed to the shaft 39 by the key 46, but in this instance is free to move longitudinally on said shaft.

When the brake device is employed and it is not desired to gradually increase the tension on the belt, the element 45 of the brake device may be keyed immediately on said shaft 39 and be arranged in substantially the same way as I have shown in Fig. 4 of my said patent; but when it is desired to gradually increase the tension on the belt it is desirable to move the element 45 of the brake device with respect to the element 44 thereof, so as to increase the friction between the parts. A convenient arrangement by which this may be done is shown in Fig. 7; but it is to be understood that I do not wish to be limited to any such arrangement, nor do I wish to be limited to a brake device for applying tension on the belt, since a multitude of devices may be employed for this purpose—such, for example, as a pneumatic or hydraulic cylinder, as explained in said patent. The special arrangement of tension-increasing device for the brake (illustrated in Fig. 7) may be, however, conveniently used, and I will claim the same as a convenient form of specific arrangement.

46' is a sleeve carried by the element 44 of the brake device by suitable arms 47, in place of which a continuous solid web may be employed, as will be obvious.

48 is a reduced portion of the shaft 39, having screw-threads thereon, and 49 is a nut working on said screw-threaded portion. A locking-nut 50 prevents the nut 49 from becoming entirely disengaged from said screw-threaded shaft 48, and a hand-wheel 51 or crank is employed for the purpose of turning said nut 49 when desired.

52 is a plate working loosely in the sleeve 46 and loosely on the screw-threaded shaft 48 and having a reduced bearing portion 53, which works against the face of the nut 49.

54 is a heavy spiral spring mounted within the sleeve 46 and seated between the element 45 of the brake device and the plate 52 referred to.

The outer face of the nut 49 is provided with a series of teeth 55, extending the entire length of said nut, and engaging with any one of said teeth is a small finger 56, carried by the outer end of the sleeve 46' and having a small handle 57 for bringing it into engagement with said teeth and for elevating it out of said engagement. 58 is a spring for keeping said finger 56 in its raised or lower position, as will be understood.

The frictional surface between the two elements of the brake device is preferably a band of leather or similar material secured either to the smooth inside slightly-inclined face of the element 44 or to the outer inclined face of the element 45, the latter arrangement being preferable and that which I illustrate. In order that this leather surface may be applied in position, a convenient arrangement (shown in Fig. 9) is to cut away the rim of the element 45, so as to form a recess 59 therein, beneath which is a hollow ear 60, cast with the face of the element 45.

61 is a triangular-shaped block extending the entire width of the outer inclined face of the element 45 and having a screw-threaded stem 62 projecting outwardly therefrom through the ear 60. 63 is a nut on said stem by means of which the triangular block 61 may be drawn tightly down into the recess 59, so as to firmly clamp the free ends of the leather or other surface 64, as will be readily understood.

65 represents the belt, which is of the proper length, which is continuous, and which is made preferably of steel links in any suitable way, so as to be driven by the sprocket-rollers 22 and 25, respectively. Commencing at the sprocket-roller 25 this belt extends down under the shaft 32, thence over a guide-roller 66, thence through an opening 67 in the web-plate 2 and in the top of the bed-plate 4 when used, thence within said bed-plate up through its forward end, around a guide-roller 68, carried in extensions 69 of the swinging arms 8, thence up and under a shaft 70, carried in boxes 71 on said swinging arms, thence around the sprocket-roller 22, thence down into the machine, so as to form a loop or bight 72, (see Fig. 6,) within which the bale is formed. Preferably, a heavy core 73 is employed, mounted within said loop or bight and carried in heavy bearings 74 in the side frames 1. By preference I also employ end flanges 75, which serve to build up the ends of the bale and keep them flat, which end flanges are provided with heavy sleeves 76, which work in said bearings 74. When the end flanges 75 are employed, the core 73 is mounted in said sleeves 76. At one end of the core a key 77 may be employed, and at the other end a collar 78 may be employed, so that the end flanges 75 will be securely held on said core against expansion. I am not the first to employ a core of this character or to use end flanges such as I have shown, and I therefore do not claim the same.

Preferably some suitable mechanism is used for withdrawing the core from the bale after the bale has been made; but I do not show any mechanism for this purpose, as such illustration might be confusing. A steam or hydraulic cylinder such as I have described and claimed in my application filed June 20, 1895, Serial No. 553,670, may be conveniently used for this purpose.

In operating, the friction of the belt on the shaft 70 may be sufficient to rotate said shaft; but in order to be certain on this point I prefer to mount a gear-wheel 79 on the end of said shaft meshing with the gear-wheel 26, so that said shaft will be positively driven. 80 is a driving-pulley keyed to the shaft 39 and by which power is applied to the press.

My invention operates as follows: In starting the bale the first few inches in diameter of the bale are formed while the arms 8 are in their lowered position, as shown in Fig. 5, the belt being in contact or substantially in contact with the core 73. Power being applied to the band-wheel 80, the pinion 41 is driven directly by said shaft, and the pinion 42 is driven by the friction between the elements of the brake device, as will be understood. These pinions drive the large gear-wheels 35 and 38, and said gear-wheels drive the pinions 34 and 36. The pinion 34 drives the gear-wheel 29', so as to positively drive the sprocket-roller 25. The pinion 36 drives the gear-wheel 30, which in turn drives the pinion 27; but since the arms 8 are in their lowered position the gear-wheel 26 is not in engagement with said pinion 27, so that in the starting of the bale the pinion 41, gear-wheel 38, pinion 36, gear-wheel 30, and pinion 27 may be disregarded. The sprocket-roller 25 being driven as explained, the endless belt will be caused to travel in the proper direction, and the endless sheet or bat of cotton is then fed to the belt immediately in front of the core 73 when used, so as to be partially wound around said core. The pressure which will be applied to the inner layers of the bale in this way will therefore be very slight; but this is desirable, since there is great danger of the cotton becoming caked on the core. When sufficient cotton has been thus wound around the core, the swinging arms 8 are moved upward, so as to engage the gear-wheel 26 with the pinion 27, and said arms 8 are locked in that position by means of the bar 16 engaging in front of the ears 15. When in this position, therefore, both the sprocket-rollers 22 and 25 will be driven, the sprocket-roller 25 being driven by the pinion 42, the gear-wheel 35, pinion 34, and gear-wheel 29', and the sprocket-roller 22 being driven by the pinion 41, gear-wheel 38, pinion 36, gear-wheel 30, pinion 27, and gear-wheel 26. Cotton in the shape of a continuous sheet or bat continues to be fed into the press, entering the same directly beneath the shaft 28, which, it will be noted, may, if desired, carry a roller for compressing the cotton upon the belt. As the cotton continues to enter the loop or bight 72 of the belt, said loop or bight will slowly commence to expand, which will cause the sprocket-roller 22 to rotate slightly faster than the sprocket-roller 25, as will be understood. This increase in speed of the sprocket-roller 22 is allowed for by the differential connection between the two sprocket-rollers and will take place only when the pressure within the loop or bight is sufficient to overcome the friction between the two elements of the brake. It will therefore be seen that while the brake device is being rapidly rotated and, if made sufficiently heavy, may serve as an effective fly-wheel, yet at the same time the two elements of the brake device are moved with respect to each other according to the enlargement of the loop or bight. By interposing a train of gears between the brake device and the sprocket-rollers, as I have explained, I am enabled to use a much smaller brake device and to use very much less friction therein, so that the amount of pressure applied to the bale can be more conveniently regulated. If, for instance, the shaft 39 turns thirty times faster than the sprocket-rollers 22 and 25, disregarding the difference in speed between said sprocket-rollers, then if a pressure of thirty thousand pounds is to be applied within the loop or bight the friction between the two elements of the brake device need only be one thousand pounds.

It will of course be understood that a greater or less number of gears may be interposed between the brake and the sprocket-rollers, whereby the amount of friction required can be made very small. I consider this a very valuable point in my invention and lay especial stress on it.

Having now described my invention, what I claim as new, and desire to secure by Letters Patent, is as follows:

1. In a cotton-press for making cylindrical bales, the combination of an endless belt a portion of which is formed into a loop or bight, a core stationed in said loop or bight and on which the bale is formed, two end flanges rotating with said core and abutting against the ends of the bale, two rollers to which said belt is positively connected, a main driving-shaft and gearing connecting said driving-shaft with said rollers, and constructed to allow one of said rollers to rotate faster than the other, substantially as set forth.

2. In a cotton-press for making cylindrical bales, the combination of an endless belt a portion of which is formed into a loop or bight, a core stationed in said loop or bight and on which the bale is formed, end flanges rotating with said core, and abutting against the ends of the bale, two rollers to which said belt is positively connected, a main driving-shaft, a friction device carried on said shaft, gearing connecting said driving-shaft with one of said rollers, and gearing connecting said friction device with the other of said rollers, whereby as the loop or bight enlarges, one of said rollers will be allowed to rotate faster than the other, substantially as set forth.

3. In a cotton-press for making cylindrical bales, the combination with the side frames, a roller mounted at the top thereof, swinging arms hinged to said side frames, the upper ends of said swinging arms interlocking with the side frames, a roller carried at the top of said swinging arms, and an endless belt passing over said rollers and formed into a loop or bight, substantially as set forth.

4. In a cotton-press for making cylindrical bales, the combination with the side frames, a roller mounted at the top thereof, swinging arms hinged to said side frames, a roller carried at the top of said swinging arms, an extension or nose on each of said swinging arms, engaging a recess in the side frames, and an endless belt passing over said rollers and formed into a loop or bight, substantially as set forth.

5. In a cotton-press for making cylindrical bales, the combination with an endless belt a portion of which is formed into a loop or bight, a core stationed in said loop or bight and on which the bale is formed, end flanges rotating with said core and abutting against the ends of the bale, two rollers to which said belt is positively connected, means for driving both of said rollers, a brake device interposed between said rollers, whereby one of said rollers will be allowed to rotate faster than the other, and means for gradually increasing the resistance of said brake device as the loop or bight enlarges, substantially as set forth.

6. In a cotton-press for making cylindrical bales, the combination of the side frames, a roller mounted at the top thereof, swinging arms hinged to said side frames, a roller carried by the upper ends of said swinging arms, an endless belt passing over said rollers and to which the belt is positively connected, a gear-wheel carried by the roller mounted in said swinging arms, and meshing with a gear-wheel carried in said side frames, whereby as said swinging arms are moved outwardly said gear-wheels will be disengaged, substantially as set forth.

7. In a cotton-press for making cylindrical bales, the combination of an endless belt a portion of which is formed into a loop or bight, two rollers stationed at the entrance of said loop or bight and to which the belt is positively connected, gear-wheels carried by said rollers for driving the same, and an idler connecting said gear-wheels, substantially as set forth.

8. In a cotton-press for making cylindrical bales, the combination of an endless belt a portion of which is formed into a loop or bight, two rollers stationed at the entrance of said loop or bight and to which said belt is positively connected, a gear-wheel 29' on the shaft of one of said rollers, a gear-wheel 26 on the shaft of the other of said rollers, a main driving-shaft 39, a pinion 41 keyed to said main driving-shaft, a gear 38 and pinion 34 connecting said pinion 41 with the gear-wheel 29' for driving one roller, a brake device carried on the shaft 39, a pinion 42 driven from said brake device, and gear-wheels 35, 30 and pinions 36 and 27 connecting the pinion 42 with the gear-wheel 26 for driving the other roller, substantially as set forth.

9. In a brake device for applying tension in cotton-presses and similar structures, the combination of the element 44, the element 45, the screw-threaded shaft 48 turning with the element 45, the sleeve 46' turning with the element 44, the nut 50 engaging with said shaft 48, a connection between said nut and the sleeve 46', and a spring 54 interposed between said nut and the element 45, substantially as set forth.

10. In a brake device for applying tension in cotton-presses and similar structures, the combination of the element 44, the element 45, a screw-threaded shaft 48 turning with the element 45, a sleeve 46' turning with the element 44, the nut 50 engaging with said shaft 48, a connection between said nut and the sleeve 46', the washer 52 bearing against said nut, and a spring 54 interposed between the element 45 and the washer, substantially as set forth.

This specification signed and witnessed this 8th day of February, 1896.

FRANK L. DYER.

Witnesses:
PHILIP F. LARNER,
ARCHIE G. REESE.